United States Patent [19]

Kalt

[11] 3,989,357

[45] Nov. 2, 1976

[54] ELECTRO-STATIC DEVICE WITH ROLLING ELECTRODE

[76] Inventor: Charles G. Kalt, Hawthorne Road, Williamstown, Mass. 01267

[22] Filed: May 27, 1975

[21] Appl. No.: 580,572

Related U.S. Application Data

[63] Continuation-in-part of Ser. No. 495,189, Aug. 8, 1974, Pat. No. 3,897,997, and a continuation-in-part of Ser. No. 438,574, Feb. 1, 1974, abandoned, which is a continuation-in-part of Ser. No. 294,590, Oct. 3, 1972, abandoned.

[52] U.S. Cl. ............................... 350/161; 350/269; 350/285
[51] Int. Cl.² .......................................... G02F 1/16
[58] Field of Search ........... 350/161, 266, 269, 285; 178/7.3 D, 7.5 D

[56] References Cited
UNITED STATES PATENTS

3,553,364 1/1971 Lee .................................... 350/269
3,897,997 8/1975 Kalt .................................... 350/161

*Primary Examiner*—William L. Sikes

[57] ABSTRACT

An electrostatic device includes a fixed electrode to which is attached an end edge of a coiled or curved variable resilient sheet electrode. An insulative layer separates the two electrodes, being either bonded to the fixed electrode or being bonded to the resilient electrode. The resilient variable electrode is caused to unroll upon the application of an electric potential between the two electrodes. The device is particularly adaptable for use as a light gate. It is capable of being actuated by an electrical potential either in a light transmission mode or in a variable reflectivity mode.

33 Claims, 18 Drawing Figures

ELECTRO-STATIC DEVICE WITH ROLLING ELECTRODE

CROSS REFERENCES TO RELATED APPLICATIONS

This application is a continuation-in-part of my co-pending application Ser. No. 495,189 filed Aug. 8, 1974 now U.S. Pat. No. 3,897,997 and is a continuation-in-part of my application Ser. No. 438,574 filed Feb. 1, 1974 which is a continuation-in-part of my application Ser. No. 294,590 filed Oct. 3, 1972 both now abandoned.

BACKGROUND OF THE INVENTION

This invention relates to an electrostatic device having a fixed and a variable electrode with an insulating layer positioned therebetween, and more particularly relates to such a device wherein the variable electrode is in the form of a roll.

A variety of electrostatic devices are known, especially those made for controlling the transmission or reflection of light by means of varying an electrical potential. Such devices generally take the form of a fixed electrode to which there is hingedly mounted a variable sheet or falp electrode that is caused to move toward and draw against the fixed electrode when an electrical potential is applied between the two electrodes.

The hinged geometry of these known devices imposes a practical limitation on the maximum size of the "aperture" of the light gates so made. Furthermore the hinged geometry devices are best suited for operation as fully closed or fully open whereas many applications for light gates exist requiring analog control of the aperture opening as a function of the applied potential.

It is therefore an object of the present invention to provide an electrostatic device having a large aperture.

It is a further object of the present invention to provide an electrostatic device adaptable for analog control of aperture opening as a function of applied potential.

It is yet a further object of the present invention to provide an electrically operable gate to various kinds of electromagnetic radiation having an essentially planar geometry and a wide aperture.

SUMMARY OF THE INVENTION

An elestrostatic device includes a fixed electrode to which is attached an end edge of a coil or roll of a variable resilient sheet electrode. An insulative layer separates the two electrodes, being either bonded to the fixed electrode or being bonded to the resilient electrode. The resilient variable electrode is caused to unroll upon the application of an electrical potential between the two electrodes.

The inner surface of the rolled variable electrode may have a color or a reflectivity that is different from that of the near surface of the fixed electrode. Accordingly, the appearance of the device to an observer changes hue or reflectivity when a potential is applied. Alternatively, the fixed electrode may be transparent to a selected portion of the electromagnetic radiation spectrum, such as light, heat, or radio frequency fields, and the variable electrode opaque. In this instance for example a light source positioned behind the device may transmit light through the device where no potential is applied, and may not transmit light when a potential is applied. In another construction, either the near surface of the fixed electrode or the inner surface of the variable electrode or both may carry a printed message or a meaningful symbol, picture or pattern. Such printed patterns may be revealed or observed according to whether a potential is applied to the device. A plurality of electrostatic display devices of the variable reflectivity or variable transmissivity types, aforementioned, may be arranged in the form of a matrix and selectively electrified to produce an alpha-numeric display or even pictures.

An electrostatic display device of this invention may additionally include at least another variable electrode having another insulative layer bonded thereto for insulating it from adjacent electrodes. Beginning with the variable electrode adjacent to the fixed electrode, each electrode may be successively electrified producing at each step the appearance of a different color, printed message, or other indicia.

An important characteristic of the electrostatic device of this invention is that the distance along the fixed electrode over which the partially unrolled variable electrode is moved may be a direct function of the magnitude of the applied potential. Thus calibration marks may be provided alongside or on an edge of the fixed electrode and the display device serves as a volt meter capable of displaying in analogue fashion any analogue quantity. The versatile electrostatic device of this invention is also capable of providing high contrast electrically variable displays either in the presence of natural light or in conjunction with an artificial light source.

BRIEF DESCRIPTION OF THE DRAWINGS

FIG. 14 shows the bottom view of a variable electrode of the device of FIG. 13, which electrode has separate regions of different colors.

DESCRIPTION OF THE PREFERRED EMBODIMENT

Figure 1:
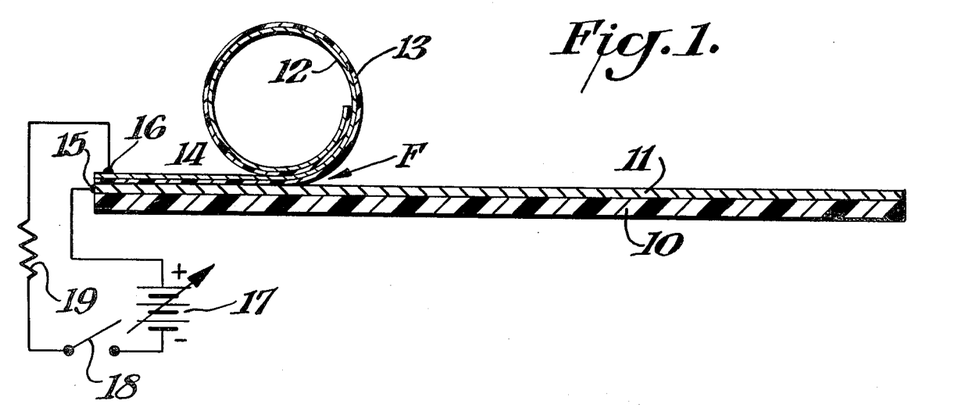
FIG. 1 shows in a sectional side view an electrostatic device of this invention having an insulative variable electrode.

An electrostatic device of this invention is shown in FIG. 1 having an electrically insulating flat base plate 10. A metal sheet 11 is bonded to the top surface of the base plate 10 and serves as the fixed electrode of the device. The variable electrode of the device is a metal film 12 that is bonded to a plastic insulating layer 13. The metal film electrode 12 and insulating layer 13 have the form of a roll, the outer end of the roll being attached, as by glue bonding, to the top surface of the fixed electrode 11 at a region 14. Electrical terminals 15 and 16 are provided to the fixed and variable electrodes, respectively, for application of an electrical potential therebetween. For this purpose, a variable d.c. voltage supply 17 is shown schematically as a variable voltage battery being connected through a switch 18 and a series resistor 19 to connections 16 and 17, respectively.

When switch 18 is closed, a potential is applied between the two electrodes and as the supply voltage is gradually increased from zero, a threshold voltage Vo is reached at which the variable electrode 12 begins to roll (to the right as shown). The electrostatic force effecting movement of the variable electrode is strongest in the area designated F in FIG. 1 that applies a torque to the roll in the direction of unrolling.

The electrostatic device will appear as a capacitor, as viewed electrically between terminals 15 and 16, and the capacity increases as the variable electrode roll moves in an unrolling direction.

If resistor 19 is near zero ohms and if prior to closing switch 18 the voltage supply 17 is set at a voltage V greater than Vo, then upon closing switch 18 an essentially constant voltage appears across the capacitor. The familiar relationship between charge $q$ on a capacitor having a capacity $c$ and an applied fixed voltage V may be differentiated with respect to time $t$ yielding:

$$\frac{dq(t)}{dt} = \frac{dc(t)}{dt} V$$

Since $$\frac{dq(t)}{dt} = i(t),$$

where $i(t)$ is the instantaneous current flowing in the capacitor, then $$\frac{dc(t)}{dt} = \frac{i(t)}{V}.$$

Relating this equation to the increasing capacitor of the unrolling electrostatic device, it is clear that the speed of unrolling is a direct function of the current. The speed of unrolling also has the dimension of inverse ohms. Thus an increase in the magnitude of the applied voltage causes an increase in current that in turn tends to increase the speed of unrolling. Also as the resistance of the series resistor 19 is made larger, it can be shown by a more comprehensive analysis that the speed of unrolling decreases. A complete analysis becomes quite complex, when account is taken of the spring constant and mass associated with the roll and both the latter quantities changing during unrolling. Furthermore, the presence of a series resistor has the effect of reducing the voltage applied to the device by an amount proportional to the current. However, it is sufficient here to note that a series resistance value may be established that determines the desired roll out or rerolling speed of the variable electrode.

Figure 2:
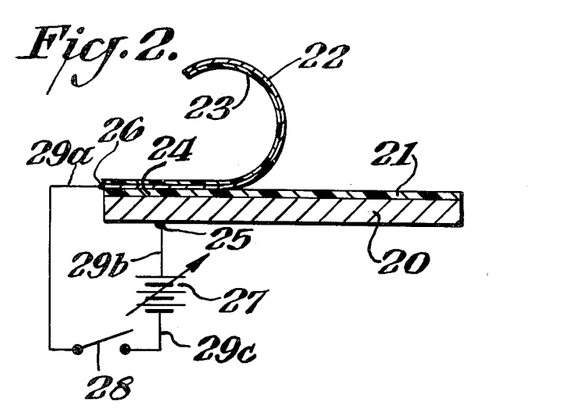
FIG. 2 shows in a sectional side view an electrostatic device of this invention having an insulated fixed electrode.

In FIG. 2 is shown another embodiment of the electrostatic device. A metal base plate 20 has an electrically insulating layer 21 on the top surface. A variable electrode 22 is laminarly bonded to an insulative sheet 23, this laminar structure being in the form of a roll. In a region 24 near the outer tail of the roll, a bond is made between the variable electrode 22 and the insulating layer 21. A voltage supply 27 is connected through a switch 28 and wires 29a, 29b and 29c to electrode connections 25 and 26 in a similar manner to that of FIG. 1. The variable electrode 22 is caused to unroll when the switch 18 is closed and the voltage supply potential is increased to an appropriate value.

In the devices of FIGS. 1 and 2, the insulating layers 13 and 23, respectively, are preferably made of a sheet of polyethyleneterephthalate, or MYLAR (a tradename of E. I. DuPont de Nemours & Co.). For small low voltage devices operating under 100 volts, the MYLAR is preferably from 0.0001 to 0.0005 inch thick, although in large devices or those employing high voltages, the insulation layer may be much thicker, e.g. 0.0005 to 0.005 inch. The variable electrode 12 or 22 is preferably a metal film having been deposited on the plastic sheet to a thickness less than 5000 angstroms and greater than 100 angstroms. Vacuum evaporation and sputtering methods for achieving such thin metal film depositions are well known. Metals such as aluminum, silver and zinc or combinations thereof are especially appropriate.

Variable electrodes of the above noted structure are almost entirely dependent upon the physical properties of the plastic for their physical and especially flexural characteristics. However, when the metal film exceeds about 5000 angstroms, the laminar variable electrodes begin to stiffen. Very thin films of metal less than about 100 angstroms have a high sheet resistivity and are near the metal atomic dimensions at which thickness the film tends to become open circuited. Of special interest are metal films in the range of thicknesses from 100 to 300 angstroms for which the conductive films are mildly transparent to light, for which practical application will be discussed later.

A spiral shaped variable electrode of the kind shown in FIG. 1 or FIG. 2 preferably consists of a thin metal film that has been vacuum deposited on a relatively thick plastic sheet. Thus the springy character of this laminate is predominantly determined by the properties of the plastic. A spiraled electrode consisted of an aluminum film of about 2000 angstroms thickness that had been deposited on a 0.0003 inch thick MYLAR sheet. The sheet was wrapped about a steel mandrel having a diameter of 0.25 inch, heated to 95° C for a time sufficient to bring this assembly to this temperature, and while still holding the sheet about the mandrel letting the assembly cool to room temperature. Other thermoplastic sheets may be formed in this same manner provided the elevated temperature adjusted to be just over the softening point of the material chosen.

Figure 3:
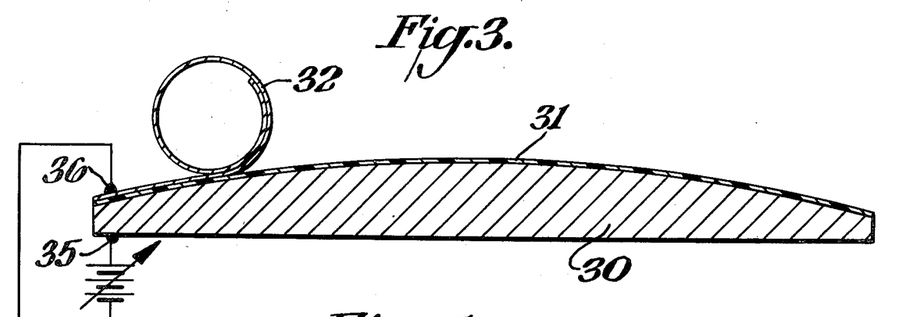
FIG. 3 shows in a sectional side view an electrostatic device of this invention having a fixed electrode with a curved surface.

FIG. 3 shows yet another embodiment of the electrostatic device of this invention, illustrating a coiled variable metal foil electrode 32 without an insulating supportive layer laminated thereto and illustrating a fixed electrode 30 having a curved surface. A metal base 30 has a curved top surface to which there is affixed an insulative layer 31. The coiled electrode 32 has a tail region attached physically to the insulative layer 31 and terminal connections 35 and 36 are provided to the fixed base electrode 30 and the variable electrode 32, respectively.

The curved surface of the fixed electrode of this structure is particularly advantageous when the device is employed as a display device with variable reflectivity. Layer 31 may have a dark essentially light absorbing quality, and variable electrode 32 may be highly reflective, at least on the inner surface thereof. The curved surface in this embodiment clearly provides an enlarged effective viewing angle.

Metal foil type variable electrodes may be formed by drawing them over the sharp corner edge of a solid rectangular piece. However, in a preferred construction, a beryllium-copper sheet is wrapped and held about a mandrel as described above, and the assembly is exposed to a temperature of about 300° C for 3 hours after which the sheet retains the spiral shape without losing its temper.

Figure 4:
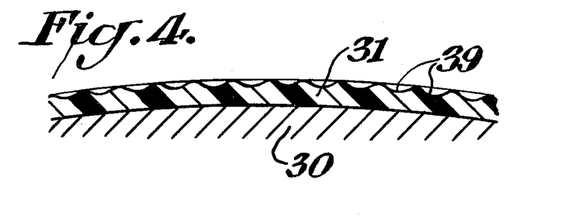
FIG. 4 shows a magnified detail of the insulated fixed electrode of FIG. 3.

A magnified view of a portion of the insulated fixed electrode 30 of FIG. 3 is shown in FIG. 4, showing undulations 39 in the outer surface of the insulating layer 31. Any convenient pattern of undulations may be suitable. When the insulative layer is a thermoplastic material, a heated platen, having the desired pattern in raised form, may be pressed or rolled over the bonded thermoplastic layer to provide the permanent pattern of undulations therein. Such surface irregularities serve to prevent pneumatic sticking and to cause the variable electrode to lie evenly over the insulative layer. Of course, the same purpose is served if the adjacent mating surface of the variable electrode has undulations therein. Further, the insulative layer may have undulations or irregularieties by reason if its being a porous or foam material. Even more generally, either of the mating surfaces or both may have an undulating pattern formed therein to effectively reduce sticking therebetween.

Figures 5, 6, 7:
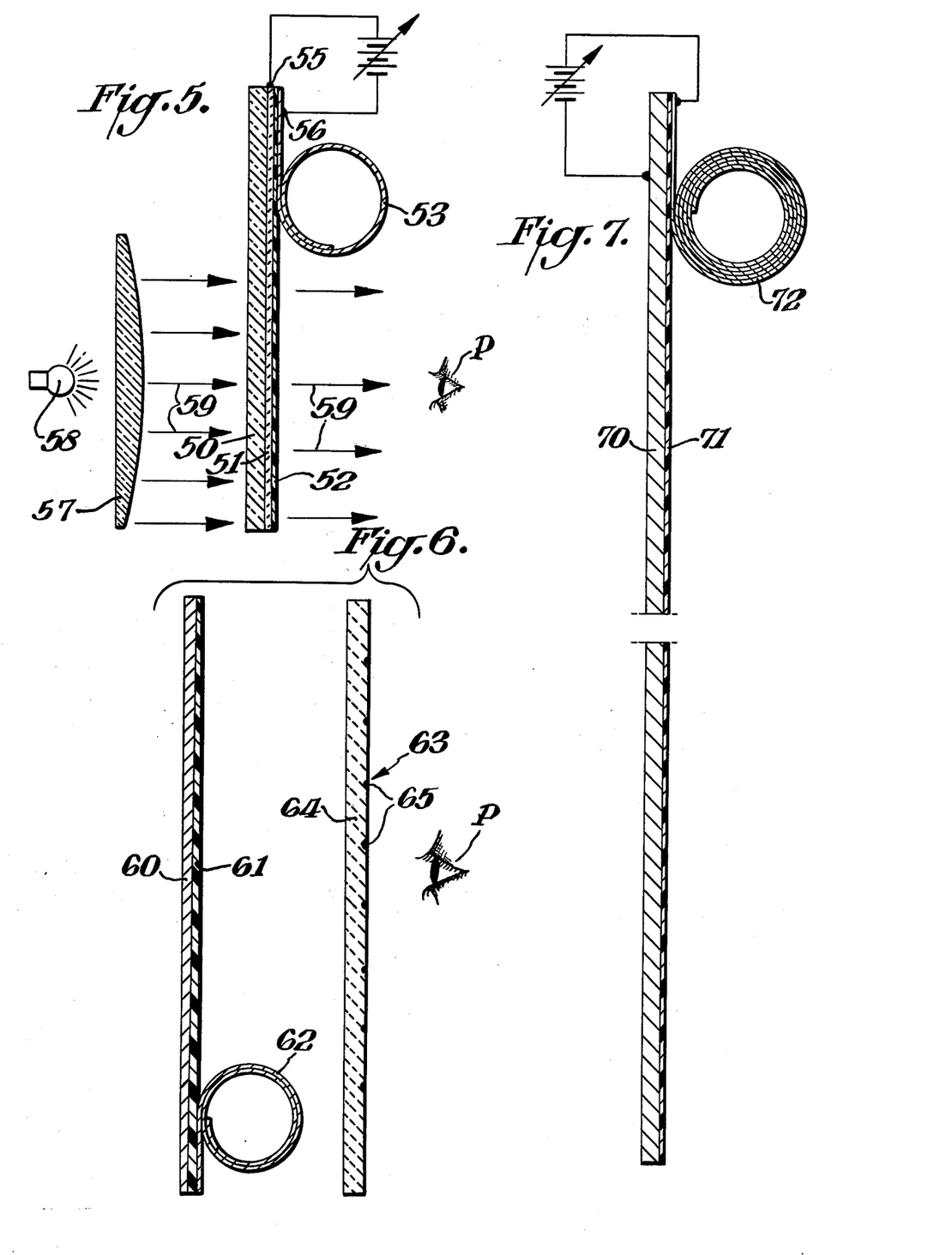
FIG. 5 shows in a sectional side view an electrostatic device of this invention used as a light valve.
FIG. 6 shows in a sectional side view an electrostatic device of this invention used as an electrostatic volt meter.
FIG. 7 shows in a sectional side view an electrostatic display device of this invention having a broad aperture.

The device of FIG. 5 illustrates a vertically mounted base plate and a rolled variable electrode that moves downward upon application of a voltage between electrodes. Also illustrated here is a fixed electrode system that is transparent to light while the variable electrode material is opaque. More particularly, the transparent base plate 50 may be of glass or a transparent plastic such as PLEXIGLAS (a tradename for an acrylic resin made by Rohm and Hass Co., Philadelphia, Pa.). The transparent fixed electrode 51 may be a film of tin oxide or may be an aluminum film having a thickness less than 300 angstroms. The transparent insulating layer 52 may be any transparent insulative material such as a sheet of polypropylene. The variable electrode 53 is preferably made from a sheet of stainless steel having been annealed to the form of a spiral spring. Terminal connections 55 and 56 are provoided for application of a voltage between the fixed and the variable electrodes, respectively.

A condensing lens 57 is mounted to the left, as shown, of the vertically mounted electrostatic shutter, and further to the left is a lamp 58 whose transmitted light 59 is made essentially parallel as from a far distant source by passing through lens 57. An observer P being positioned on the right side of the device now sees light being transmitted through the transparent insulated fixed electrode system. When a potential is applied between connections 55 and 56, the variable electrode rolls downward obscuring and blocking the transmitted light to the observer. When the potential is removed and the voltage between the fixed and variable electrodes is reduced sufficiently, the spring action of the variable electrode rerolls the variable electrode permitting light to be transmitted to the observer as before.

As has been noted in the above discussion, movement of the variable electrode only begins after the voltage has reached a threshold voltage. The threshold voltage of a particular electrostatic device of this invention is strongly dependent upon the spring constant associated with the coiled variable electrode. The stronger the spring constant becomes the larger the threshold voltage becomes. Also, clearly the threshold voltage of a particular device changes as a function of its mounting position. The vertically mounted device of FIG. 5 has a lower threshold than when mounted horizontally as illustrated in FIG. 2. If the device of FIG. 5 were inverted so that the variable electrode coil is near the bottom and must unroll in an upward direction, the threshold voltage would be higher yet. Furthermore, as the variable electrode coil unrolls the coiled roll has a progressively lower mass and when the device is mounted vertically, as shown in FIG. 5, gravitational forces tending to help unroll the coil become progressively smaller.

Another factor affecting the variation in sensitivity of the device as it unrolls derives from the fact that the outer turns of the spring coil have a larger radius than the inner turns and therefore the spring tension to be overcome by the electrostatic field become progressively greater as the smaller radius turns are exposed for unrolling.

In FIG. 6 there is shown a device in which the above noted varying spring force is compensated by gravity and by an insulating layer 61 on the vertical fixed electrode 60 having a tapered thickness. In this way it is possible to provide a device whereby after the voltage has reached the initial threshold value, the upward displacement of the roll 62 is a linear function of further increases in the applied voltage.

The practical use of the linear operation as illustrated by the device in FIG. 6, is further illustrated by a gradicule 63 being placed parallel to and in front of (to the right as shown) the electrostatic device. The gradicule is made of a light transparent plate 64 having a linear grid of dark lines 65 printed or impressed on a surface thereof. The gradicule lines 65 are shown as being perpendicular to the paper and are linearly spaced. An observer P now can read the displacement of the roll by reference to the lines in the gradicule and from a predetermined relationship between voltage and displacement can know what voltage is being applied. Thus a simple electrostatic analogue transducer is provided, equivalent to a conventional d'Arsonval moving indicator volt meter. When the insulation layer 61 and the variable electrode 62 are fractions of an inch in thickness, full scale sensitivity may be as low as a few volts, experimental devices having operated at 30 volts full scale.

On the other hand, in certain voltage monitoring applications, it is desirable to have a highly non-linear transducer, such as meters whose pointer displacement is a logarythmic function of the applied voltage. Such a transducer is provided by the electrostatic device of FIG. 7. For this purpose it is necessary that the threshold voltage for further unrolling is always increasing, and this may be achieved, as illustrated in FIG. 7, by the decreasing radii of the variable electrode turns, each turn requiring a greater electrostatic force for unrolling. The metal base fixed electrode 70 is vertically mounted and has an insulating layer 77 of constant thickness on one surface. The coiled roll of sheet metal 72 has a plurality of turns, the inner turn having less than half the radius of the outermost turn as shown. The tail of the outermost turn is mounted to the top of the insulating layer 71. Now, when a voltage is applied the initial threshold voltage is made smaller by the relatively large downward gravitational force on the multi-turn roll.

Small increments of additional voltage are required to cause the unrolling of the first turn compared with the increasingly larger increments of additional voltage required to unroll the progressively stiffer successive turns. Meanwhile the weight of the yet unrolled portion of the variable electrode is becoming smaller and aiding less in the unrolling. Thus mainly for these two reasons the displacement of the roll in the device of FIG. 7 is made highly non-linear as a function of the applied voltage.

Figures 8, 9:
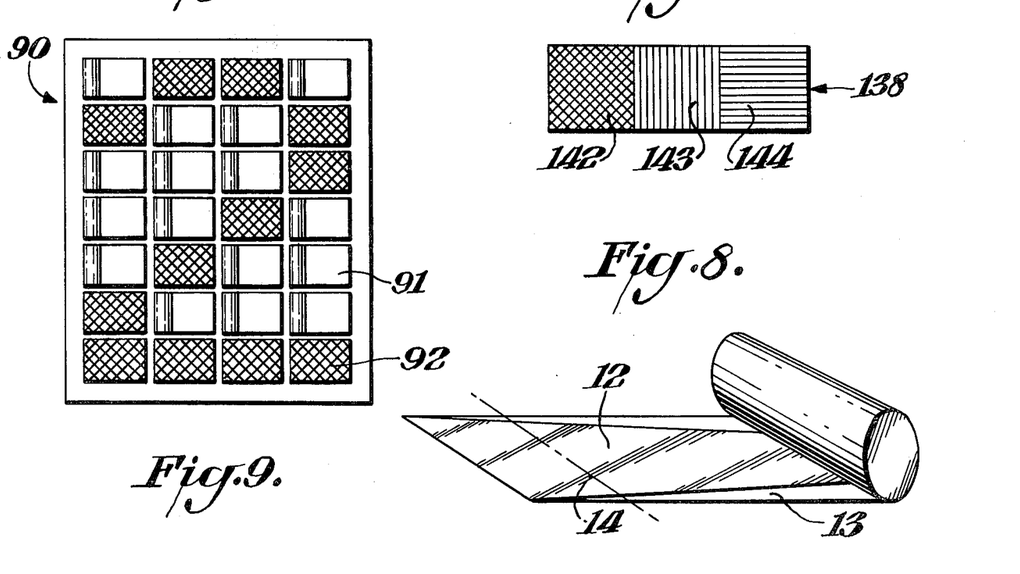
FIG. 8 shows a perspective view of an electrostatic device of this invention having a fixed electrode of varying width.
FIG. 9 shows in a top view a matrix of electrostatic devices of this invention used as an alpha-numeric display element.

Another means for tayloring the sensitivity function between displacement and voltage is illustrated in the partially unrolled variable electrode system shown in FIG. 8. The electrode in FIG. 8 may be conveniently employed in the device of FIG. 1 and the same numeral designations are used. The approximate region 14 near the end edge of the roll where attachment is affected to the fixed electrode is designated by a dashed line in FIG. 8. The insulating layer 13 is of constant width as was the case in FIG. 1; however the variable electrode no longer is of equal width but rather tapers from a maximum width near the end edge of the roll and region 14 becoming progressively narrower in the direction of unrolling. The tapered electrode of FIG. 8 has an equivalent performance characteristic to that in the device of FIG. 7. The electrostatic force per volt exerted on the roll diminishes as the roll is unrolled and a more non-linear transducer action is achieved. Of course the taper in the width of the variable electrode may be reversed so as to achieve a more linear action as is effected by tapering the insulation layer 61 in FIG. 6. Variations in the width of the fixed electrode 11 in FIG. 1 will of course accomplish the same purpose. Clearly many permutations in the structure of the variable electrode, the fixed electrode and device mounting positions are possible for providing a variety of wanted sensitivity functions. For example, the fixed electrode may consist of a metal plate having a matrix of raised portions or plateaus to which the variable electrode is attracted, and the surface areas of these raised portions per unit length of the fixed electrode may vary as a function of the electrode length. In general, any particular geometry of the fixed or variable electrodes that results in a change in the active area per unit length of that electrode, for the purpose of tayloring and determining the sensitivity function of the device, is considered to be within the scope of this invention.

Although the above discussion emphasizes the achievement of various sensitivity functions for analog electrostatic devices, the same factors are important in designing devices for use as simple on-off operation. For example, the sensitivity may be greater initially than at the final unrolling of the variable electrode. This may be realized in the device of FIG. 6, wherein the mass of the roll is progressively smaller when unrolling and gravitational forces tending to retard unrolling are progressively smaller. Thus a voltage great enough to begin the unrolling will be capable of completely unrolling the variable electrode. Of course, any of the devices illustrated may be caused to switch by applying a voltage of sufficient magnitude. Also the voltage must then be reduced significantly before the variable electrode begins to re-roll. Thus the device exhibits a hysteresis effect and will be recognized as being capable of being addressed by a combination of d.c. bias voltages and pulse voltages, or a combination of pulses thus simplifying the driving circuitry required for addressing a matrix of such electrostatic devices. Such driving schemes for a matrix of devices possessing hysteresis is well known, as for example the X and Y half-write drive systems used in selectively addressing square loop magnetic memory cores in a random access core memory.

A matrix 90 of electrostatic display devices of this invention (e.g. as shown in FIG. 1) as shown in FIG. 9. Twelve of the devices are shown electrified and unrolled, device 92 being one of these. The inside surface of the electrified variable electrodes has a color that is indicated by the cross hatching, which color is distinctly different than the exposed fixed electrodes of the un-electrified devices, such as device 91. The twelve electrified devices thus are shown to form the number 2. In a similar manner, a matrix of the electrostatic devices of FIG. 5 provides a back lighted display wherein a number 2 is displayed when devices 91 of FIG. 9 are electrified and devices 91 are not.

The versatility of the electrostatic device of this invention is further enhanced by its suitability for use in both very small and very large radiation gating or reflection applications. For example, the array of devices shown in FIG. 9 described above as an alpha-numeric display unit, is capable of being made very small. The whole matrix of 32 roll-out devices may have a square area less than 0.2 square inch. On the other hand, the matrix may be sealed up for use as a venetian blind type window shade that controls the amount of light entering a window of a building or home by electrical means. Also, since the electrostatic forces that are responsible for the movement of the rolling electrode in the device of this invention are in the same direction regardless of the polarity of the applied voltage, a.c. voltages are suitable for actuating the device.

Figure 10:
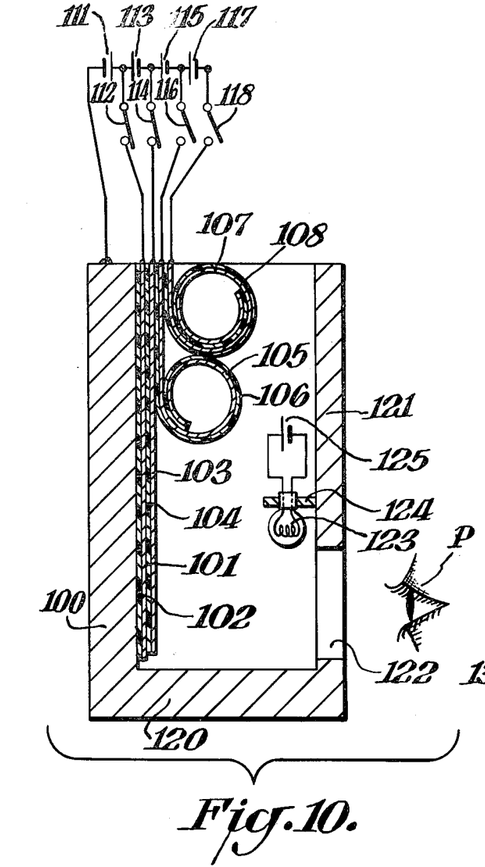
FIG. 10 shows in a sectional side view a compound electrostatic display device of this invention having a plurality of variable electrodes.

The device of FIG. 10 has a metal fixed electrode 100. A first variable electrode 101 is laminated with an insulating layer 102 and is shown electrified and fully unrolled, being driven by a battery 111 through a closed switch 112. A second variable electrode 103 is mounted to and insulated from the first variable electrode 101 by being laminated to a second insulating layer 104. It is shown electrified by a battery 113 through closed switch 114 and is fully extended. In a similar manner a third variable electrode 105 having an insulation layer 106, and a fourth variable electrode 107 having an insulation layer 108 are attached in stacked fashion to the underlying electrodes, respectively. The third and fourth variable electrodes are capable of being energized by battery 115 with switch 116 and battery 117 and switch 118, respectively. Both of these switches are shown open and the third and fourth variable electrodes are shown fully coiled.

An extension 120 of the fixed electrode 100 forms a base portion and a further extension 121 forms another wall portion of a housing containing the multiple variable electrode electrostatic display device. A window 122 is provided in wall 121, through which a viewer P may view the display. Lamp 123 is mounted by bracket 124 to the inside of wall 121. The device is powered by a battery 125 so as to provide internal illumination. In this device the inside surface of any one of the variable electrodes may be exposed to the viewer. These inside surfaces may carry printed matter or other information as might be useful for example in guiding a machine operator through a sequence of operating steps.

Figure 11:
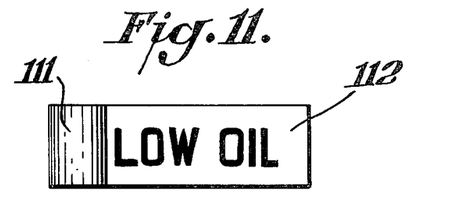
FIG. 11 shows in a top view an electrostatic device of this invention having printed indicia on the fixed electrode.
Figure 12:
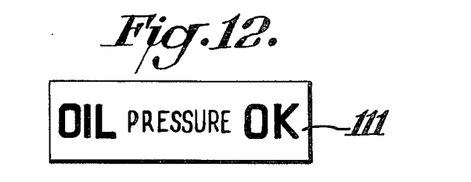
FIG. 12 shows the top view of the device of FIG. 11 having printed indicia on the unrolled variable electrode.

In a simple device as shown in FIGS. 1, 2 and 3, the fixed electrode may have a printed message on the surface of the fixed electrode system and another printed message on the inner surface of the variable electrode system, as is illustrated in FIGS. 11 and 12, respectively.

In FIG. 11 the variable electrode 111 is shown, from a top view, in its initial coiled and unexcited position. The fixed base portion 112 of the device includes the fixed electrode and has a message imprinted thereon. In FIG. 12, the variable electrode 111 is shown fully unrolled and covering the base 112 as with a switching voltage being applied between the electrodes. The unrolled variable electrode is shown having another message imprinted on the inside surface thereof.

Figure 13:
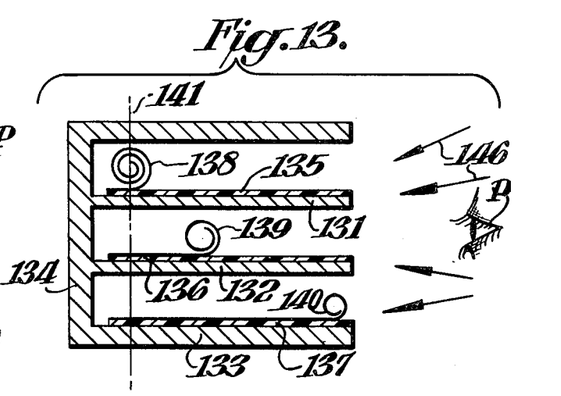
FIG. 13 shows in a sectional side view another compound electrostatic device of this invention.

In FIG. 13 there is shown a compound device comprising three roll-out electrostatic devices. The fixed electrodes 131, 132 and 133 lie in mutually parallel planes and extend at right angles from a supporting plate 134. Each of the fixed electrodes lhas an insulating layer 135, 136 and 137, respectively, bonded to a top surface thereof. The corresponding variable electrodes 138, 139 and 140, respectively, are of a metal foil, having thin outer roll ends attached to the insulation layers at points that essentially lie in a plane 141 that is orthogonal to the parallel planes of the fixed electrodes. The outer surfaces have regions of different colors 142, 143 and 144, as seen in the fully extended bottom view of the variable electrode 138 in FIG. 14. By properly exiting one of these individual electrostatic devices the viewer P sees a change from color 142 to 143. This display is illuminated externally by natural or artificial light 146. An increase in excitation voltage results in another change in color from color 143 to 144. In general, the compound device of FIG. 13 may be used as a coded indicating display device. More particularly if the three colors are primary pigment colors, the combined effect of displaying more than one color simultaneously is to give the impression of a fourth, fifth, etc. color.

Figure 15:
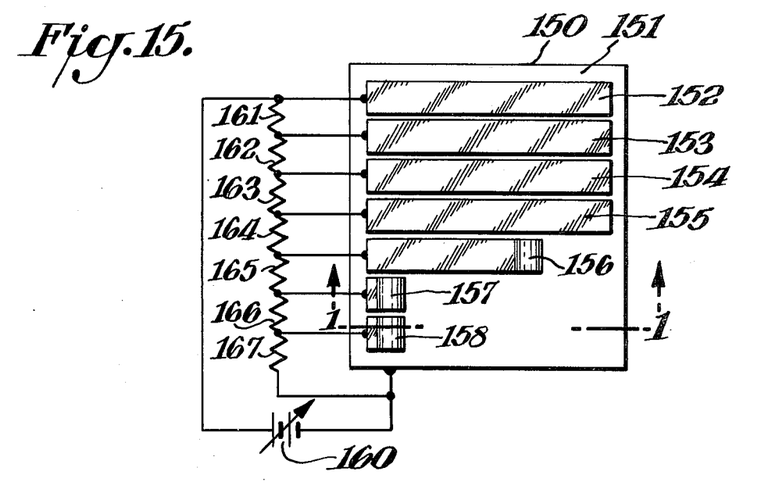
FIG. 15 shows a top view of yet another compound electrostatic device of this invention serving as a bar graph volt meter.

In FIG. 15 there is shown another compound device of this invention having one large fixed electrode 150. An insulating layer 151 covers the top surface of the fixed electrode 150. A plurality of identical variable electrode rolls 152 through 158 have their roll ends attached to the insulating layer 151 in a straight line so that each is capable of rolling out in a right hand direction as shown. A group of series connected resistors 161 through 167 have approximately equal resistance values. Each variable electrode is attached to the junction between two of the series connected resistors such that adjacent variable electrodes are attached to adjacent resistor junctions. Now when a variable voltage 160 is connected across the series connected resistors and an end of the voltage supply is also connected to the fixed electrode 150, the variable electrodes are capable of indicating the magnitude of the voltage in bar graph display form, as shown.

Figure 16:
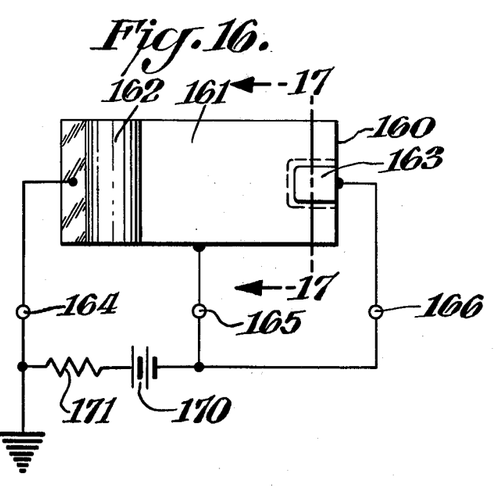
FIG. 16 shows a top view of an electrostatic relay device of this invention.
Figure 17:
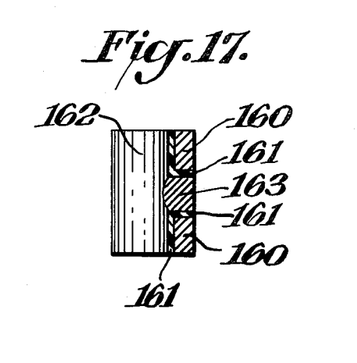
FIG. 17 shows an end sectional view of the relay device of FIG. 16.

In FIGS. 16 and 17 there is shown an electrostatic device having a metal base plate fixed electrode 160 having an insulating layer 161 bonded to a top surface. A metal foil variable electrode 162 is shown in the rolled and unexcited position. The fixed electrode has a notch at the opposite end to that where the variable electrode is attached. The insulative layer 161 extends into and covers the walls of the notch. A metal contact 163 is fitted in the insulated notch so as to protrude slightly above the top surface of the insulative layer 161. Electrical contact is made to the variable electrode 162, the fixed electrode 160 and the contact 163 and connected to terminals 164, 165 and 166, respectively. When a switching voltage is applied between terminals 164 and 165, the variable electrode unrolls and overlies the contact 163 making an electrical connection thereto. Thus electrical continuity is established between terminals 164 and 166. When the voltage between terminals 164 and 165 is removed the variable electrode rerolls and the terminal 166 is again electrically open or floating. Thus the device of FIGS. 16 and 17 represent a novel electrostatic relay.

If a high impedance voltage source, represented in FIG. 16 by battery 170 and series resistor 171, is connected between 164 and 165 the variable electrode slowly unrolls. When terminals 165 and 166 are shorted as shown, and the fully extended variable electrode 16 touches contact 163, the variable and fixed electrodes are suddenly at the same potential causing the capacity of the electrostatic device to discharge and the variable electrode quickly rerolls to the unexcited position at which point in time the cycle repeats itself. Such a device is useful as a blinking display to attract attention or to serve as a warning.

Many variations in the relay device of FIG. 16 are possible. For example, other insulated contacts such as contact 163 may be installed in the fixed electrode (from left to right as shown) so that a larger number of them are contacted as the variable electrode unrolls. Alternatively, more than one contact may be installed in a vertical line to create a single throw but multiple pole switching relay.

Figure 18:
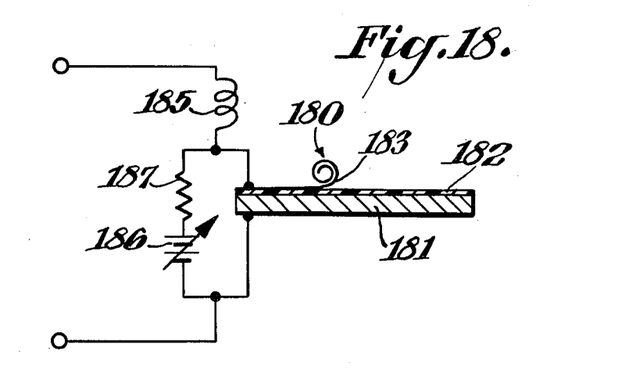
FIG. 18 shows an electrostatic device of this invention employed in a series resonant circuit capable of being electrically tuned.

Another feature of the device of this invention is that the electrical capacitance, as viewed between the electrical terminals, increases as the variable electrode unrolls. Thus at any instant of time the capacitance is a unique function of the degree of unrolling that has been effected. The degree of unrolling may be made a positive function of the voltage applied to the device as has been noted. In FIG. 18, the device 180 is connected in series with an inductor 185 and serves therewith as a series tuned L-C type circuit being "electronically" tunable. The device 180 consists of a metal fixed electrode 181, having an insulative layer 182 bonded to a flat surface thereof and a variable electrode 183. The capacitance of the device 180 is adjusted by varying the amplitude of the d.c. voltage source 186. The voltage source 186 is connected in series with a resistor 187 and in turn to the electrodes of the device 180.

The electrical capacitance being a function of the applied voltage in a device of this invention may be applied in numerous other ways. For example, when a step function of voltage of sufficient amplitude is applied to the electrodes of the device, the device capacitance may be made to switch from a small value to a value orders of magnitude greater. The device thus serves as an electrically controlled capacitive switch that is useful in applications ranging from data storage to the gating of a.c. signals.

What is claimed is:

1. An electrostatic device with a rolling electrode comprising:
   a. a fixed electrode of an electrically conductive material;
   b. at least one resilient variable electrode comprising a sheet of electrically conducting material having the shape of a spiral roll and being physically attached near one end thereof to a surface of said fixed electrode; and
   c. a layer of electrically insulative material being positioned between said fixed and said variable electrodes, said fixed and variable electrodes being of such relative geometries that when an electrical potential is applied between said fixed and variable electrodes, said variable electrode extends in the direction of unrolling and covers a large portion of said surface of said fixed electrode.

2. The electrostatic device of claim 1 wherein said fixed electrode is a sheet of metal being bonded to an insulative base plate.

3. The electrostatic device of claim 1 wherein said fixed electrode is a metal plate.

4. The electrostatic device of claim 1 wherein said insulative layer is bonded to the outer surface of said variable electrode having the shape of a spiral roll.

5. The electrostatic device of claim 4 wherein said insulative layer is polyethyleneterephthalate having a thickness of from 0.0001 to 0.0005 inch.

6. The electrostatic device of claim 4 wherein said variable electrode is a film of metal having a thickness of less than 5000 angstroms.

7. The electrostatic device of claim 6 wherein one of said fixed or variable electrodes has a changing surface area per unit length in said direction of unrolling for the purpose of determining the sensitivity function of said device.

8. The electrostatic device of claim 1 wherein said insulative layer is bonded to said surface of said fixed electrode.

9. The electrostatic device of claim 1 additionally comprising an insulative sheet being bonded to the inner surface of said variable electrode, said variable electrode being a film of metal less than 5000 angstroms in thickness.

10. The electrostatic device of claim 1 wherein said fixed electrode is transparent to a selected portion of the electromagnetic spectrum, and is bonded to a substrate that is transparent in said selected spectrum portion and said variable electrode is opaque in said selected spectrum portion.

11. The electrostatic device of claim 10 wherein said selected spectrum portion is visible light.

12. The electrostatic device of claim 10 wherein said insulative layer is transparent in said selected spectrum portion.

13. The electrostatic device of claim 10 additionally comprising a source of radiation is said selected spectrum portion positioned to transmit said radiation through said transparent fixed electrode so that when a potential is applied between said fixed and variable electrodes, said transmitted radiation is stopped from being transmitted through said device.

14. The electrostatic device of claim 1 wherein said insulative layer is bonded to one of said fixed and variable electrodes, the opposite unbonded surface of said insulative layer having undulations therein to prevent total contact between said insulative layer and the other of said electrodes when said variable electrode extends over said fixed electrode in response to said electrical potential for the purpose of preventing pneumatic sticking therebetween.

15. The electrostatic device of claim 1 wherein the inner surface of said variable electrode and said surface of said fixed electrode have significantly different light-reflective characteristics.

16. The electrostatic device of claim 1 wherein said insulative layer is of variable thickness, being tapered in said direction of said unrolling.

17. The electrostatic device of claim 1 wherein said variable electrode has the shape of a spiral roll having a plurality of turns, the inner of said turns having a substantially smaller radius than the outer of said turns so that a substantially greater increment of electrostatic force is required to unroll said inner turns than that required to unroll said outer turns.

18. The electrostatic device of claim 1 wherein said insulative layer is bonded to the outer surface of said variable electrode having the shape of a spiral roll, said device additionally comprising a second resilient variable electrode including a sheet of electrically conducting material having the shape of a spiral roll having bonded to the outer surface thereof a second insulative layer, said second variable electrode being physically attached near one end thereof to said at least one variable electrode in an area near said attachment of said at least one variable electrode to said surface of said fixed electrode, the direction of unrolling of said variable electrode being the same as said direction of unrolling of said at least one variable electrode.

19. The electrostatic device of claim 1 wherein said surface of said fixed electrode carries a printed pattern that is visible when zero potential is applied between said fixed and variable electrodes, said pattern being obscured by said variable electrode when an electrical potential is applied between said fixed and variable electrodes.

20. The electrostatic device of claim 1 wherein the inner surface of said variable electrode having the shape of a spiral roll carries indicia that becomes visible when a potential is applied between said fixed and variable electrodes.

21. The electrostatic device of claim 1 wherein said surface of said fixed electrode is flat.

22. The electrostatic device of claim 1 wherein said surface of said fixed electrode is curved in said direction of said rolling of said variable electrode.

23. The electrostatic device of claim 1 additionally comprising an analogue calibration means for visually determining at any instant the degree of said extending of said variable electrode, so that said degree of extending may directly indicate said applied potential between said fixed and variable electrodes according to a predetermined relationship having been established therebetween.

24. The electrostatic device of claim 1 additionally comprising a series circuit comprising a resistor and a d.c. voltage source, said series circuit being connected between said fixed and variable electrodes; said variable and fixed electrodes having said insulative layer positioned therebetween forming a capacitor so that when the magnitude of said d.c. voltage changes, the capacitance of said capacitor changes.

25. The electrostatic device of claim 1 wherein said insulative layer is bonded to said surface of said fixed electrode, and wherein said device additionally comprises a metal contact being physically mounted to said fixed electrode, said contact protruding slightly above the outer surface of said bonded insulative layer, said contact lying in an area of said surface of said fixed electrode that is covered by said variable electrode when said variable electrode is unrolled and is contacted thereby, for the purpose of forming an electrostatic relay device.

26. The electrostatic relay device of claim 25 wherein said contact is insulated from said fixed electrode.

27. The electrostatic relay device of claim 25 additionally comprising a series connected resistor and a voltage source that is connected between said fixed and variable electrodes, said contact being electrically connected to said fixed electrode, for the purpose of forming a self oscillating display indicating device.

28. The electrostatic device of claim 1 additionally comprising at least another fixed planar electrode, another rolled variable electrode and another insulative layer positioned therebetween, said another variable electrode being physically attached near one end thereof to said another fixed electrode, said fixed planar electrodes being mounted in parallel planes, respectively, and the points of said electrode attachment lying in another plane that is orthogonal to said parallel planes, the outer surfaces of said rolled variable electrodes having different colors, respectively.

29. The electrostatic device of claim 1 additionally comprising a voltage source, a resistor, and a switch connected in series between said fixed and said variable electrodes, so that the speed of said unrolling may be adjusted by varying the value of said resistor.

30. A plurality of electrostatic devices of claim 1 wherein said fixed electrodes of said plurality of devices lie in one plane and all of said surfaces of said fixed electrodes face outward from said plane in the same direction, said devices forming a rectangular display matrix such that the application of an electric potential to selected of said plurality of display devices creates a visual pattern capable of being recognized as a picture, letter or number.

31. A plurality of devices of claim 1 having a common fixed electrode, the points of said attachment of each said variable electrode lying essentially in a straight line, such that all of said variable electrodes when excited extend in the same direction from said straight line.

32. The plurality of devices of claim 31 additionally comprising a plurality of series connected resistors and a voltage source being connected across said series resistor, one side of said voltage source also being connected to said common fixed electrode, a first of said variable electrodes being connected to a first of said resistors, successive connections being made between adjacent electrodes and adjacent resistors, respectively, so that the number of unrolled electrodes becomes a measure of the voltage magnitude of said voltage source.

33. The electrostatic device of claim 1 wherein said insulative layer is bonded to one of said fixed and variable electrodes, the surface of the other of said electrodes that is adjacent to said insulative layer having undulations therein to prevent total contact between said insulative layer and said other electrode when said variable electrode extends over said fixed electrode in response to said electrical potential for the purpose of preventing pneumatic sticking therebetween.

* * * * *